(12) United States Patent
Chiang et al.

(10) Patent No.: US 10,387,138 B2
(45) Date of Patent: Aug. 20, 2019

(54) ELECTRONIC DEVICE AND SOFTWARE UPDATING AND REGISTRATION TEMPLATE GENERATING METHOD

(71) Applicant: Egis Technology Inc., Taipei (TW)

(72) Inventors: Yuan-Lin Chiang, Taipei (TW); Yu-Chun Cheng, Taipei (TW)

(73) Assignee: Egis Technology Inc., Taipei (TW)

( * ) Notice: Subject to any disclaimer, the term of this patent is extended or adjusted under 35 U.S.C. 154(b) by 0 days.

(21) Appl. No.: 15/976,888

(22) Filed: May 11, 2018

(65) Prior Publication Data

US 2019/0095188 A1 Mar. 28, 2019

Related U.S. Application Data

(60) Provisional application No. 62/561,687, filed on Sep. 22, 2017.

(30) Foreign Application Priority Data

Mar. 21, 2018 (CN) .......................... 2018 1 0235754

(51) Int. Cl.
  *G06F 8/65* (2018.01)
  *G06F 9/445* (2018.01)
(52) U.S. Cl.
  CPC ............ *G06F 8/65* (2013.01); *G06F 9/44505* (2013.01)
(58) Field of Classification Search
  None
  See application file for complete search history.

(56) References Cited

U.S. PATENT DOCUMENTS

| 7,542,590 | B1* | 6/2009 | Robinson | G06K 9/00006 382/115 |
| 9,619,633 | B1* | 4/2017 | Mortensen | G06F 21/32 |
| 2006/0239511 | A1* | 10/2006 | White | G06F 21/32 382/115 |
| 2011/0213981 | A1* | 9/2011 | Griffin | H04L 9/3231 713/172 |
| 2013/0232082 | A1* | 9/2013 | Krawczewicz | G06F 19/324 705/55 |

(Continued)

OTHER PUBLICATIONS

Scheidat, "Automatic Template Update Strategies for Biometrics", 2007, University of Magdeburg, Germany (Year: 2007).*

*Primary Examiner* — Hossain M Morshed
(74) *Attorney, Agent, or Firm* — JCIPRNET

(57) ABSTRACT

An electronic device and a registration template generating method are provided. The method includes: obtaining first biometric information; determining, by first software, whether the first biometric information passes verification according to the first biometric information and a first registration template; generating, by second software, a pre-enrolled dataset according to the first biometric information if the first biometric information passes verification; generating a second registration template corresponding to the second software according to the pre-enrolled dataset when an amount of data of the pre-enrolled dataset is greater than a threshold; and determining, by the second software, whether second biometric information passes verification according to the second biometric information and the second registration template when the second biometric information is obtained.

16 Claims, 5 Drawing Sheets

(56) References Cited

U.S. PATENT DOCUMENTS

2013/0259330 A1* 10/2013 Russo ................ G06K 9/00087
  382/124
2017/0324736 A1* 11/2017 Connell, II ......... H04L 63/0861
2018/0053005 A1*  2/2018 Kamal ................. G06F 21/602

* cited by examiner

ELECTRONIC DEVICE AND SOFTWARE UPDATING AND REGISTRATION TEMPLATE GENERATING METHOD

CROSS-REFERENCE TO RELATED APPLICATION

This application claims the priority benefit of U.S. provisional application Ser. No. 62/561,687, filed on Sep. 22, 2017 and China application serial no. 201810235754.3, filed on Mar. 21, 2018. The entirety of the above-mentioned patent application is hereby incorporated by reference herein and made a part of specification.

BACKGROUND OF THE INVENTION

Field of the Invention

The invention relates to an electronic device and a software updating and registration template generating method.

Description of Related Art

Biometric information (e.g., a fingerprint or a voiceprint) has been extensively used for verification of a user identity. When a software developer releases a new version of software (e.g., a fingerprint recognition algorithm) to replace an old version of software, the new version and the old version of software are generally operated independently of each other, and the method of generating a registration template is also different from each other. Therefore, the registration template for the old version of software is generally not applicable to the new version of software. Specifically, the registration template contains information relevant to verifying whether the biometric information inputted by a user is valid and authorized. However, when the new version of software is installed, since it is necessary to re-generate and store the registration template for the new version of software, the user is required to re-register a fingerprint. In other words, even if the fingerprint recognition algorithm may be updated and installed through automatic updates, the user is still required to re-register the fingerprint, which causes inconvenience to the user.

SUMMARY OF THE INVENTION

The invention provides an electronic device and a software updating and registration template generating method, in which after a new version of software is downloaded and installed, an old version of software is still used to verify a user identity. After a registration template of the new version of software is generated according to biometric information that passes verification, the new version of software is then used to verify the user identity. Accordingly, software update is completed and the registration template for the new version of software is generated without requiring the user to re-register a fingerprint.

The invention provides an electronic device, including an input device, a storage device and a processor. The storage device is configured to store first software, second software and a first registration template corresponding to the first software. The processor is coupled to the input device and the storage device. The input device obtains first biometric information. The first software determines whether the first biometric information passes verification according to the first biometric information and the first registration template. The second software generates a pre-enrolled dataset according to the first biometric information when the first biometric information passes verification. The processor generates a second registration template corresponding to the second software according to the pre-enrolled dataset when an amount of data of the pre-enrolled dataset is greater than a threshold. The input device obtains second biometric information. The second software determines whether the second biometric information passes verification according to the second biometric information and the second registration template.

The invention provides a software updating and registration template generating method configured for an electronic device. The electronic device includes an input device, a storage device and a processor. The storage device stores first software, second software and a first registration template corresponding to the first software. The method includes the following steps. The input device obtains first biometric information. The processor executes the first software to determine whether the first biometric information passes verification according to the first biometric information and the first registration template. The processor executes the second software to generate a pre-enrolled dataset according to the first biometric information when the first biometric information passes verification. The processor generates a second registration template corresponding to the second software according to the pre-enrolled dataset when an amount of data of the pre-enrolled dataset is greater than a threshold. The input device obtains second biometric information. The processor executes the second software to determine whether the second biometric information passes verification according to the second biometric information and the second registration template.

Accordingly, in the electronic device and the software updating and registration template generating method of the invention, after the software is updated, the old-version software and its registration template are still used for verification, and the pre-enrolled dataset of the new-version software is generated based on the biometric information that passes verification. When the amount of data of the pre-enrolled dataset of the new-version software is greater than the threshold, the pre-enrolled dataset of the new-version software may be used to generate the registration template for the new-version software. Afterwards, use of the old-version software will be stopped, and the new-version software and its registration template will be used for verification. Therefore, the user is not required to re-register the biometric information after the software update.

To provide a further understanding of the aforementioned and other features and advantages of the disclosure, exemplary embodiments, together with the reference drawings, are described in detail below.

DESCRIPTION OF THE EMBODIMENTS

Figure 1:
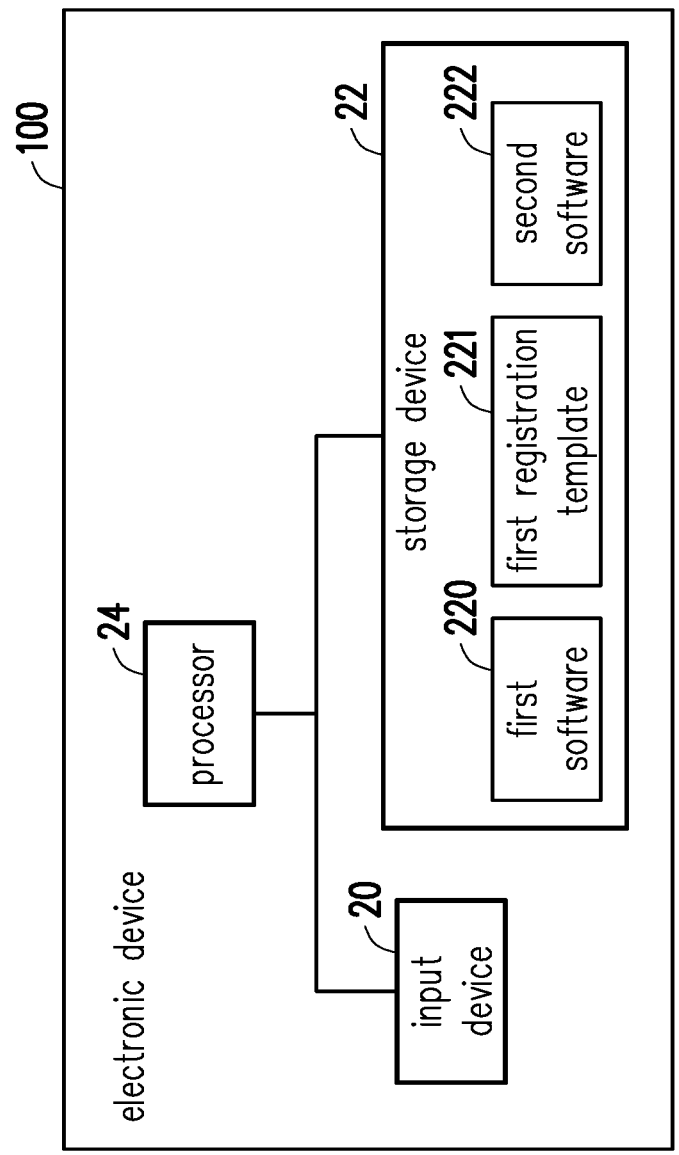
FIG. 1 is a schematic diagram illustrating an electronic device according to an embodiment of the invention.

Reference will now be made in detail to the exemplary embodiments of the invention, examples of which are illustrated in the accompanying drawings. Moreover, wherever possible, devices/components labeled with the same reference numbers in the drawings and the embodiments represent the same or like parts.

FIG. 1 is a schematic diagram illustrating an electronic device according to an embodiment of the invention.

Referring to FIG. 1, an electronic device 100 includes an input device 20, a storage device 22 and a processor 24. The input device 20 and the storage device 22 are respectively coupled to the processor 24. The electronic device 100 is, for example, an electronic device such as a mobile phone, a tablet computer, a notebook computer, etc., but is not limited hereto.

The input device 20 includes, for example, a sensing component or circuit configured to sense and capture biometric information. In the present exemplary embodiment, the input device 20 is, for example, an optical fingerprint sensor, a capacitive fingerprint sensor, an ultrasonic fingerprint sensor, or a fingerprint sensor of other type, and is configured to sense and obtain fingerprint information. However, in other embodiments, the input device 20 may also be configured to sense biometric information of other types, such as vein information, but is not limited hereto. The embodiments below are described based on the example where the input device 20 is configured to obtain fingerprint information.

The processor 24 may be a central processing unit (CPU) or another programmable general-purpose or specific-purpose microprocessor, digital signal processor (DSP), programmable controller, application specific integrated circuit (ASIC), another similar device, or a combination of the devices above.

In the present exemplary embodiment, the storage device 22 of the electronic device 100 stores a plurality of code segments. After the code segments are installed, the code segments are executed by the processor 24. For example, the storage device 22 includes a plurality of modules, and the modules are respectively configured to execute operations in the electronic device 100, wherein each of the modules comprises one or more code segments. However, the invention is not limited hereto. The operations of the electronic device 100 may also be implemented in hardware form or combination of hardware and software.

In the present exemplary embodiment, the storage device 22 stores first software 220 (i.e., a first fingerprint recognition algorithm) and a first registration template 221 corresponding to the first software 220. When the input device 20 obtains a fingerprint image (also referred to as biometric information) of a user, the processor 24 executes the first software 220 to determine whether the fingerprint image passes verification according to the obtained fingerprint image and the first registration template 221.

Particularly, when a developer of the first software releases a new version of the first software 220 (hereinafter referred to as second software 222), the user may download the second software 222 and store it in the storage device 22, or the electronic device 100 may download the second software 222 and store it in the storage device 22 through automatic update. In other words, the first software 220 and the second software 222 are the same kind of software (for example, both are fingerprint recognition algorithm), but the version of the first software 220 is different from the version of the second software 222. For example, a version serial number of the first software 220 is smaller than a version serial number of the second software 222 (namely, the version of the first software 220 is older than the version of the second software 222).

After a plurality of fingerprint images pass verification, the electronic device 100 generates a second registration template corresponding to the second software 222 based on the fingerprint images that pass verification. After the second registration template is generated, the electronic device 100 stops using the first software 220 and instead uses the second software 222 and its second registration template to perform verification of a user identity. More detailed embodiments are described in the text below.

Figure 2A:
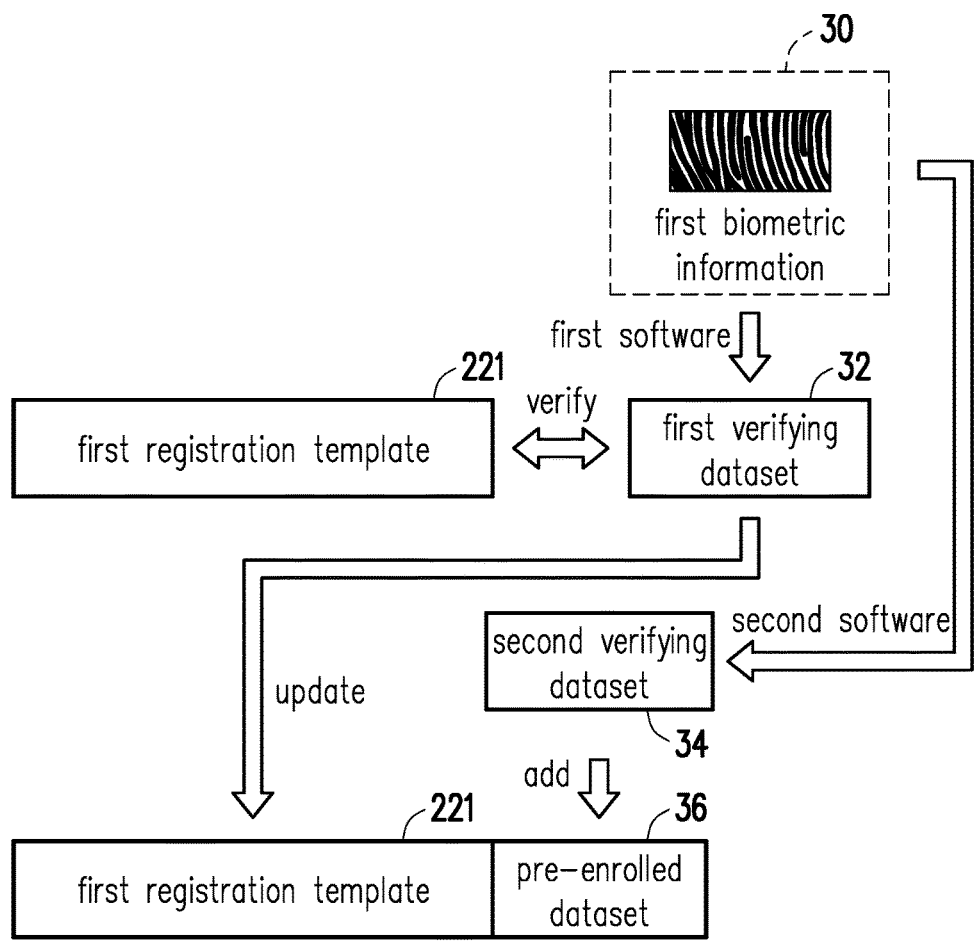
FIG. 2A, FIG. 2B and FIG. 2C are schematic diagrams illustrating a registration template generating method according to an embodiment of the invention.
Figure 2B:
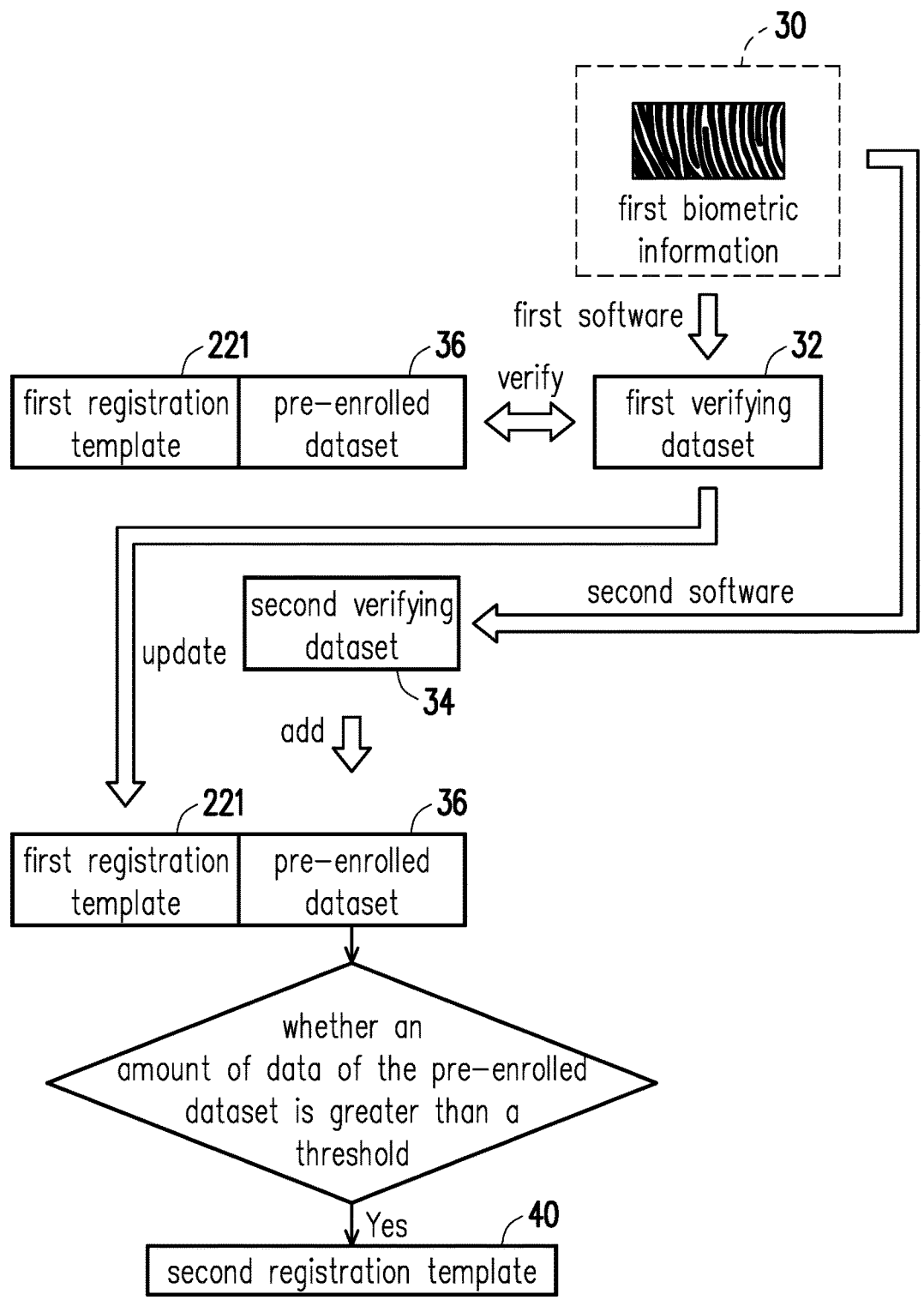
Figure 2C:
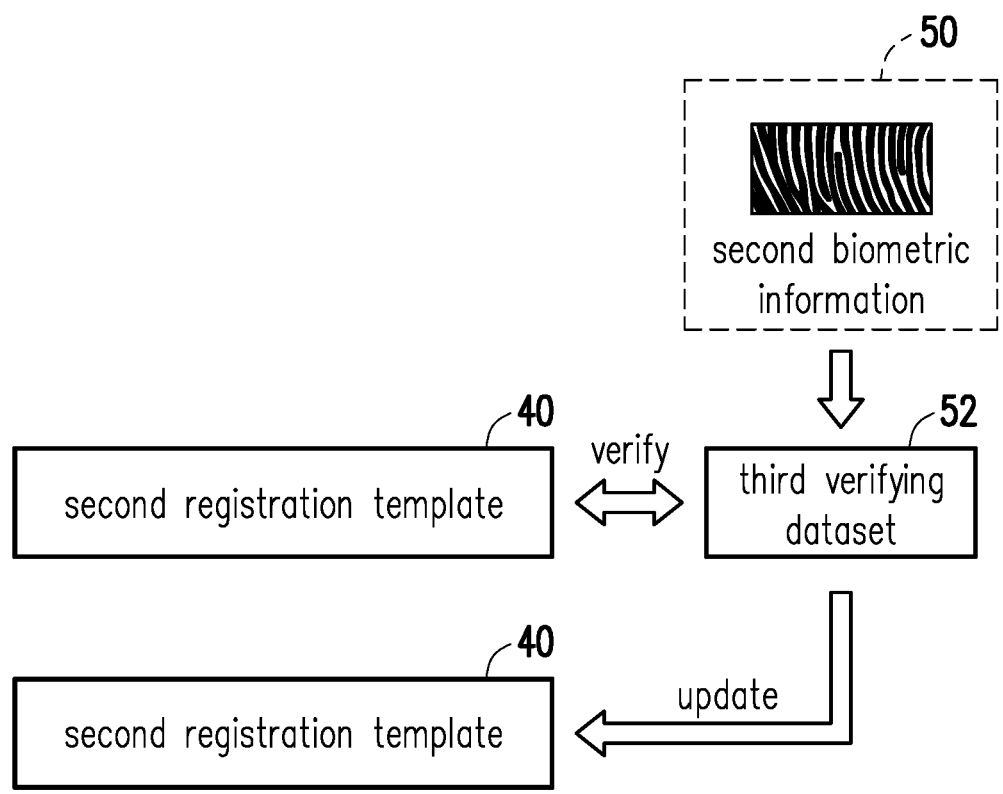

FIG. 2A, FIG. 2B and FIG. 2C are schematic diagrams illustrating a registration template generating method according to an embodiment of the invention.

First, referring to FIG. 2A, the input device 20 may collect and obtain a fingerprint (also referred to as first biometric information 30) of a user. Then, the processor 24 may determine whether the first biometric information 30 passes verification according to the first biometric information 30 and the first registration template 221 stored in the storage device 22.

Specifically, the processor 24 executes the first software 220 to generate a first verifying dataset 32 according to the first biometric information 30. The first verifying dataset 32, for example, comprises information regarding fingerprint features (e.g., feature points) extracted by the first software 220 from the first biometric information 30. Next, the first software 220 determines whether the first verifying dataset 32 matches the first registration template 221. When the first verifying dataset 32 matches the first registration template 221, the first software 220 determines that the first biometric information 30 passes verification.

Moreover, when the first biometric information 30 passes verification, the processor 24 executes the second software 222 to generate a second verifying dataset 34 according to the first biometric information 30 and then accordingly generate a pre-enrolled dataset 36 corresponding to the second software 222. Specifically, the second software 222, for example, extracts feature points from the first biometric information 30 to generate the second verifying dataset 34. In other words, the second verifying dataset 34, for example, comprises fingerprint features (e.g., feature points) extracted by the second software 222 from the first biometric information 30. Afterwards, the processor 22 may add the second verifying dataset 34 into the pre-enrolled dataset 36 corresponding to the second software 222 as shown in FIG. 2A.

Moreover, in the present exemplary embodiment, when the first biometric information 30 passes verification, the processor 24 further updates the first registration template 221 based on the verified first verifying dataset 32 to obtain the updated first registration template 221.

Particularly, when an amount of data of the pre-enrolled dataset 36 corresponding to the second software 222 is not greater than a threshold (which means that an amount of the collected second verifying datasets 34 is still insufficient), the electronic device 100 continues to verify the user identity by using the first software 220 and obtains more first biometric information 30 to generate more second verifying datasets 34 to be added into the pre-enrolled dataset 36. For example, referring to FIG. 2B, in a manner similar to FIG. 2A, the input device 22 may again collect and obtain the first biometric information 30. Then, the processor 24 executes the first software to generate the first verifying dataset 32 according to the first biometric information 30. Next, the processor 24 determines whether the first verifying dataset 32 matches the first registration template 221. When the first verifying dataset matches the first registration template, the processor 24 determines that the first biometric information passes verification. The processor 24 may update the first registration template 221 with the verified first verifying dataset 32 to obtain the updated first registration template 221.

Moreover, when the first biometric information passes verification, the processor 24 executes the second software 222 to extract the fingerprint feature points in the first biometric information 30 (i.e., the fingerprint information) to generate the second verifying dataset 34 corresponding to the second software 222. Afterwards, the processor 24 adds the second verifying dataset 34 into the pre-enrolled dataset 36 corresponding to the second software 222 as shown in FIG. 2B to generate the updated pre-enrolled dataset 36.

Different from the embodiment of FIG. 2A, in the embodiment of FIG. 2B, when the amount of data of the pre-enrolled dataset 36 corresponding to the second software 222 is greater than the threshold, the processor 24 generates the second registration template 40 corresponding to the second software 222 according to the pre-enrolled dataset 36. For example, the processor 24 may directly store the pre-enrolled dataset 36 as the second registration template 40 corresponding to the second software 222. After the second registration template 40 is generated, the electronic device 100 stops using the first software 220 and instead uses the second software 222 and its second registration template 40 to perform verification of user identity.

More specifically, referring to FIG. 2C, when the input device 20 obtains a fingerprint image (hereinafter referred to as second biometric information 50) inputted by the user, the processor 24 executes the second software 222 to generate a third verifying dataset 52 according to the second biometric information 50, and compares the third verifying dataset 52 with the second registration template 40 to determine whether the third verifying dataset 52 matches the second registration template 40. More specifically, the third verifying dataset 52 includes, for example, fingerprint features (e.g., feature points) extracted by the second software 222 from the second biometric information 50. When the third verifying dataset 52 matches the second registration template 40, the processor 24 determines that the second biometric information 50 passes verification.

Moreover, when the third verifying dataset 52 matches the second registration template 40, the processor 24 may update the second registration template 40 with the third verifying dataset 52 that passes verification to generate the updated second registration template 40.

Figure 3:
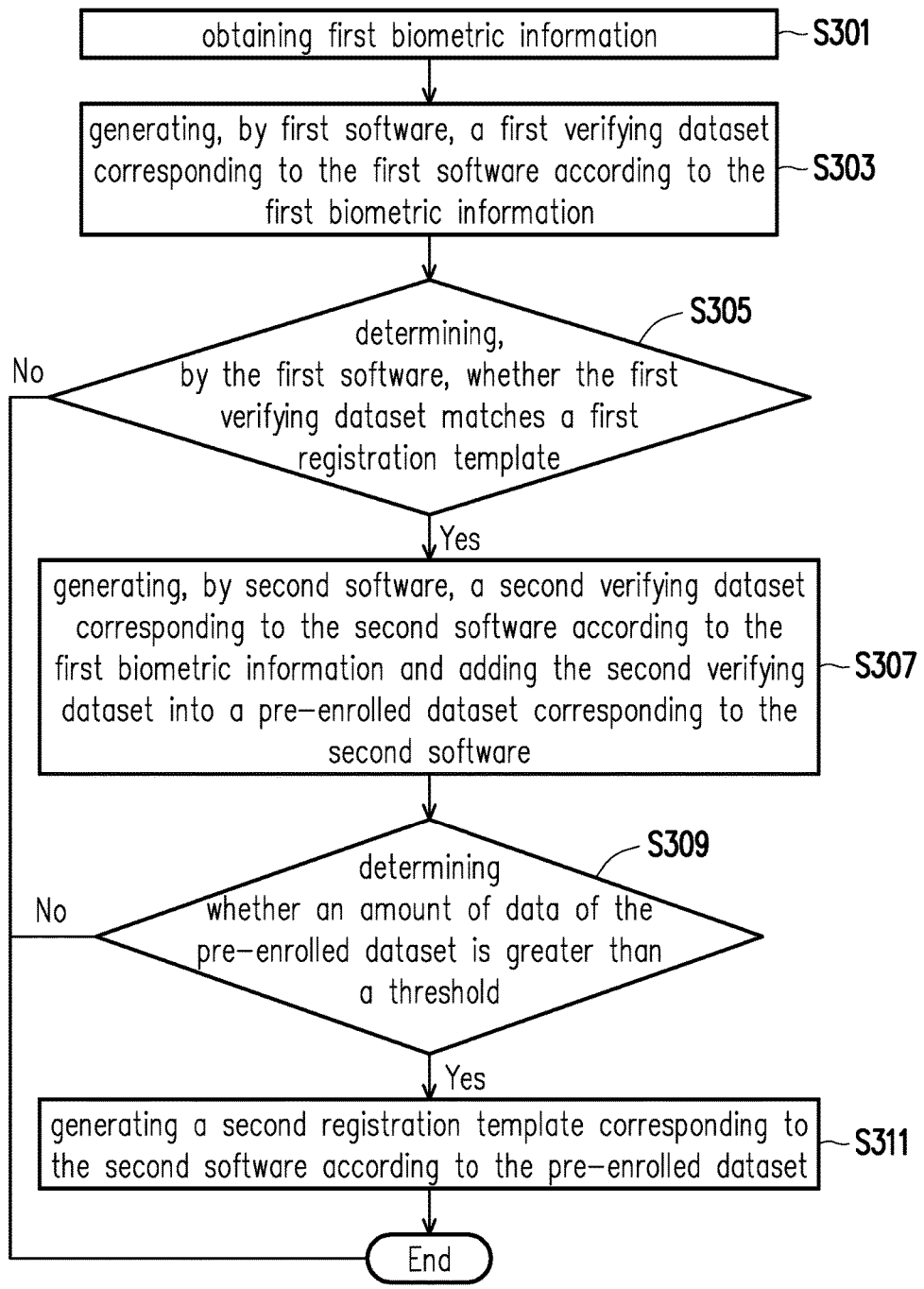
FIG. 3 is a flowchart illustrating a registration template generating method according to an embodiment of the invention.

FIG. 3 is a flowchart illustrating a registration template generating method according to an embodiment of the invention.

Referring to FIG. 3, in step S301, an input device 20 obtains first biometric information. In step S303, first software 220 generates a first verifying dataset 32 corresponding to the first software 220 according to the first biometric information. In step S305, the first software 220 determines whether the first verifying dataset 32 matches a first registration template 221. When the first verifying dataset 32 does not match the first registration template 221, the first software 220 determines that the first biometric information 30 does not pass verification. Then, the process of FIG. 3 ends. When the first verifying dataset 32 matches the first registration template 221, in step S307, the first software 220 determines that the first biometric information passes verification. Then, second software 222 generates a second verifying dataset 34 corresponding to the second software 222 according to the first biometric information 30 and the second verifying dataset 34 is added into a pre-enrolled dataset 36 corresponding to the second software 222.

Next, in step S309, the processor 24 determines whether an amount of data of the pre-enrolled dataset 36 is greater than a threshold. When the amount of data of the pre-enrolled dataset 36 is not greater than the threshold, the process in FIG. 3 ends. However, when the amount of data of the pre-enrolled dataset 36 is greater than the threshold, in step S311, the processor 24 generates a second registration template 40 corresponding to the second software 222 according to the pre-enrolled dataset 36. Therefore, update of the software and generation of a new registration template is completed. Afterwards, when the electronic device 100 performs verification of user identity, the input device 20 obtains second biometric information 50 (i.e., fingerprint information of the user) and then the second software 222 determines whether the second biometric information 50 passes verification according to the second biometric information 50 and the second registration template 40. In other words, after software update is completed and the new registration template is generated, the embodiments of the invention use the second software 222 and its second registration template 40 to perform verification of user identity.

In summary of the above, in the electronic device and the registration template generating method of the embodiments of the invention, after the software is updated, the registration template of the old-version software is used to perform verification, and after verification is passed, the pre-enrolled dataset of the new-version software is generated according to the verified fingerprint information. Next, when the amount of data in the pre-enrolled dataset of the new-version software is greater than the threshold, the registration template of the new-version software will be generated according to the pre-enrolled dataset of the new-version software. Afterwards, use of the old-version software may be stopped, and the new-version software and its registration template may be used instead to perform verification. Accordingly, without requiring the user to re-register the fingerprint, update of the software (e.g., the fingerprint recognition algorithm) is completed and the registration template of the new-version software is generated, which makes software update and generation of the new registration template safer and more convenient.

Although the invention has been disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:
1. An electronic device comprising:
an input device:
a storage device configured to store first software, second software and a first registration template corresponding to the first software; and
a processor coupled to the input device and the storage device, wherein
the input device obtains first biometric information,
the processor executes the first software to determine whether the first biometric information passes verification according to the first biometric information and the first registration template,
the processor executes the second software to generate a pre-enrolled dataset according to the first biometric information if the first biometric information passes verification, the processor generates a second registration template corresponding to the second software according to the pre-enrolled dataset when an amount of data of the pre-enrolled dataset is greater than a threshold, the input device obtains second biometric information; and the processor executes the second software to determine whether the second biometric information passes verification according to the second biometric information and the second registration template.

2. The electronic device according to claim 1, wherein when the processor executes the first software to determine whether the first biometric information passes verification according to the first biometric information and the first registration template, the processor executes the first software to generate a first verifying dataset corresponding to the first software according to the first biometric information and determine whether the first verifying dataset matches the first registration template, and the processor executes the first software to determine that the first biometric information passes verification if the first verifying dataset matches the first registration template.

3. The electronic device according to claim 2, wherein the first software updates the first registration template based on the first verifying dataset if the first verifying dataset matches the first registration template.

4. The electronic device according to claim 1, wherein when the processor executes the second software to generate the pre-enrolled dataset corresponding to the second software according to the first biometric information, the second software generates a second verifying dataset corresponding to the second software according to the first biometric information and adds the second verifying dataset into the pre-enrolled dataset corresponding to the second software.

5. The electronic device according to claim 4, wherein the processor executes the second software to determine whether the second biometric information passes verification according to the second biometric information and the second registration template, the second software generates a third verifying dataset corresponding to the second software according to the second biometric information and determines whether the third verifying dataset matches the second registration template, and the second software determines that the second biometric information passes verification when the third verifying dataset matches the second registration template.

6. The electronic device according to claim 5, wherein the second software updates the second registration template based on the third verifying dataset if the third verifying dataset matches the second registration template.

7. The electronic device according to claim 1, wherein a version of the first software is older than a version of the second software.

8. The electronic device according to claim 1, wherein after generating the second registration template corresponding to the second software according to the pre-enrolled dataset, the processor does not execute the first software and stops using the first registration template for performing verification.

9. A software updating and registration template generating method for an electronic device, the electronic device comprising an input device, a storage device and a processor, wherein the storage device stores first software, second software and a first registration template corresponding to the first software, the method comprising:

obtaining, by the input device, first biometric information;

executing, by the processor, the first software to determine whether the first biometric information passes verification according to the first biometric information and the first registration template;

executing, by the processor, the second software to generate a pre-enrolled dataset according to the first biometric information if the first biometric information passes verification;

generating, by the processor, a second registration template corresponding to the second software according to the pre-enrolled dataset when an amount of data of the pre-enrolled dataset is greater than a threshold;

obtaining, by the input device, second biometric information; and executing, by the processor, the second software to determine whether the second biometric information passes verification according to the second biometric information and the second registration template.

10. The software updating and registration template generating method according to claim 9, wherein the step of determining whether the first biometric information passes verification according to the first biometric information and the first registration template comprises:

generating, by the first software, a first verifying dataset corresponding to the first software according to the first biometric information and determining whether the first verifying dataset matches the first registration template; and determining, by the first software, that the first biometric information passes verification if the first verifying dataset matches the first registration template.

11. The software updating and registration template generating method according to claim 10, further comprising:

updating, by the first software, the first registration template based on the first verifying dataset if the first verifying dataset matches the first registration template.

12. The software updating and registration template generating method according to claim 9, wherein the step of generating the pre-enrolled dataset corresponding to the second software according to the first biometric information comprises:

generating, by the second software, a second verifying dataset corresponding to the second software according to the first biometric information and adding the second verifying dataset into the pre-enrolled dataset corresponding to the second software.

13. The software updating and registration template generating method according to claim 12, wherein the step of determining whether the second biometric information passes verification according to the second biometric information and the second registration template comprises:

generating, by the second software, a third verifying dataset corresponding to the second software according to the second biometric information and determining whether the third verifying dataset matches the second registration template; and determining, by the second software, that the second biometric information passes verification if the third verifying dataset matches the second registration template.

14. The software updating and registration template generating method according to claim 13, further comprising:

updating, by the second software, the second registration template based on the third verifying dataset if the third verifying dataset matches the second registration template.

15. The software updating and registration template generating method according to claim 9, wherein a version of the first software is older than a version of the second software.

16. The software updating and registration template generating method according to claim 9, wherein after the step of generating the second registration template corresponding to the second software according to the pre-enrolled dataset, the method further comprises:

stopping executing the first software and stopping using the first registration template for performing verification.

* * * * *